UNITED STATES PATENT OFFICE.

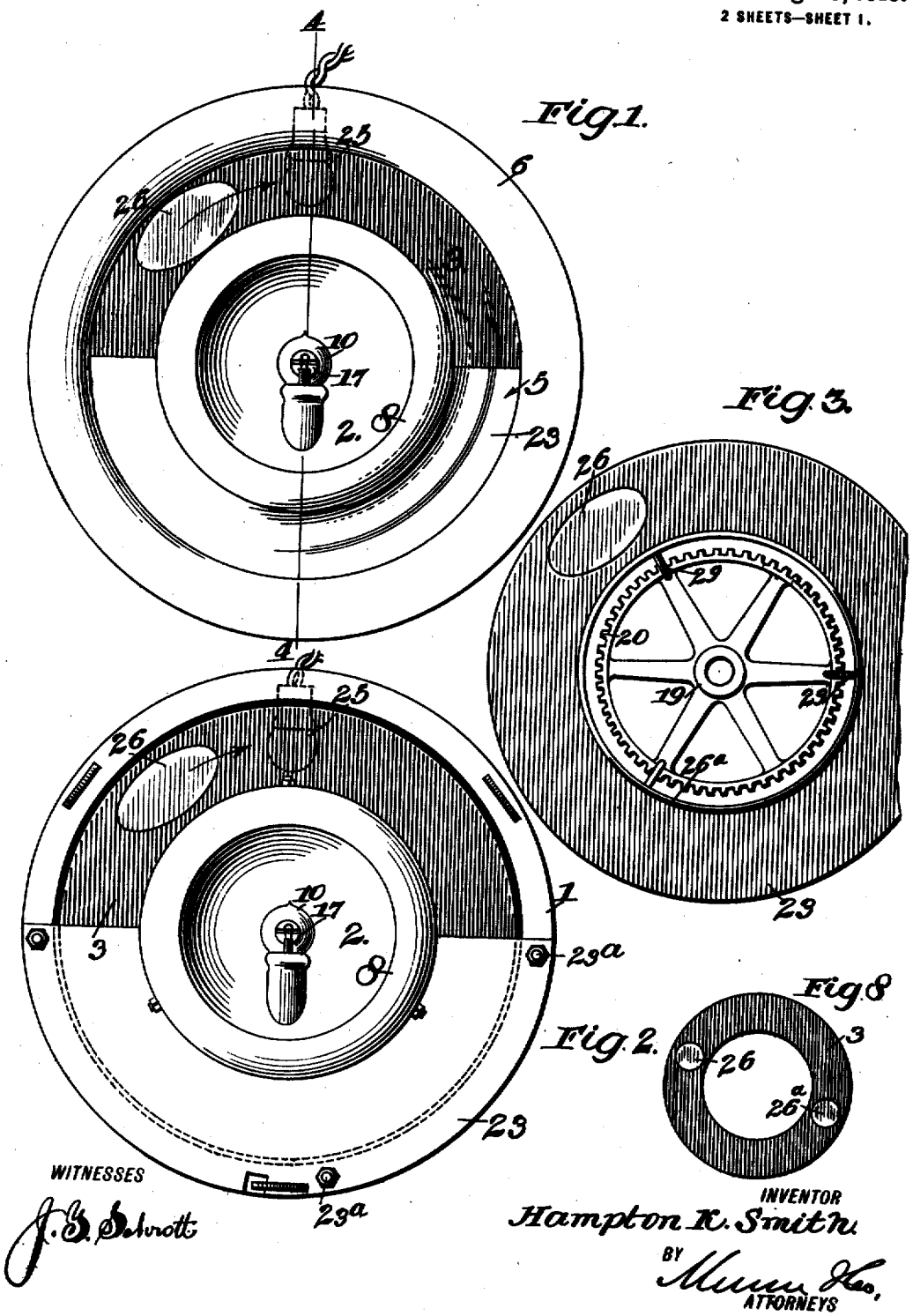

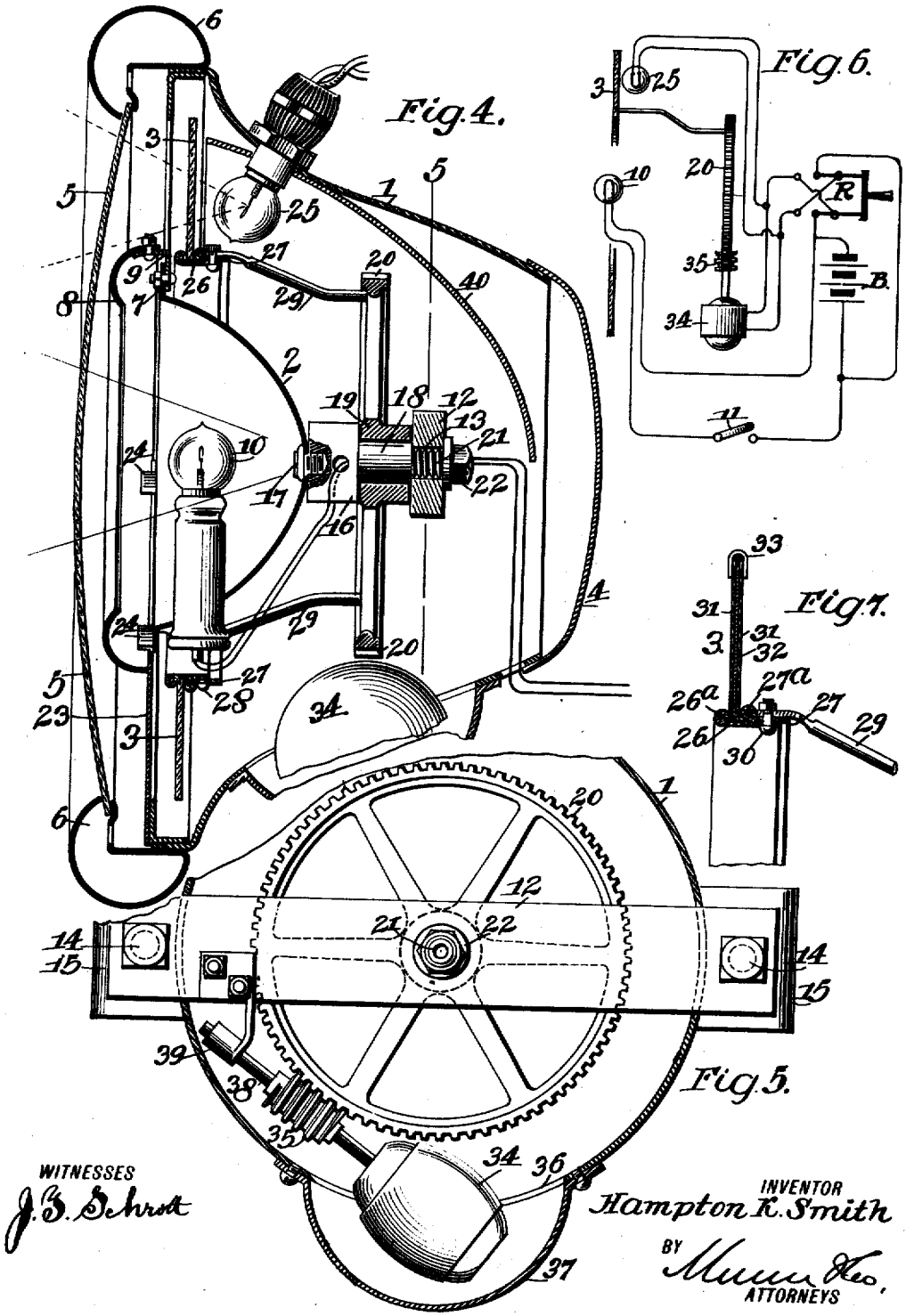

HAMPTON K. SMITH, OF UNION, SOUTH CAROLINA, ASSIGNOR TO EDITH K. SMITH.

AUTOMOBILE-SIGNAL.

1,313,346.  Specification of Letters Patent.  Patented Aug. 19, 1919.

Application filed February 28, 1918. Serial No. 219,708.

*To all whom it may concern:*

Be it known that I, HAMPTON K. SMITH, a citizen of the United States, and a resident of Union, in the county of Union and State of South Carolina, have invented certain new and useful Improvements in Automobile-Signals, of which the following is a specification.

My invention relates to improvements in automobile signals, and it consists in the constructions, combinations and arrangements herein described and claimed.

An object of my invention is to provide an automobile signal including a rotatable signal member with means for shielding a portion of said signal member, and render visible only those rays of light passing through the signal member above said shield when the signal member is illuminated.

Another object of the invention is to provide a headlight for an automobile, with a lamp adapted to be continuously lighted in the dark, a signal member being mounted circumjacent to the headlight with a lamp for illuminating a portion of the signal member, said lamp and signal member being adapted to be operated in unison and at intervals.

Other objects and advantages will appear in the following specification, reference being had to the accompanying drawings in which:

Figure 1 is a front elevation of a headlight illustrating the embodiment of the invention, Fig. 2 is a front elevation of the headlight, the cover glass being removed, Fig. 3 is a detail elevation of the signal member, showing the worm gear carried thereby, Fig. 4 is a vertical longitudinal section taken on the line 4—4 of Fig. 1, Fig. 5 is a detail cross section on the line 5—5 of Fig. 4, Fig. 6 is a diagrammatic view showing the operating circuit connections, Fig. 7 is a detail section of a slight modification in the construction of the signal member, and Fig. 8 is a detail view of a slight modification in the construction of the signal member.

In carrying out my invention I provide a headlight consisting of three principal parts, namely, the headlight casing 1, the headlight reflector 2 which is fixed in the center of the casing 1, and the circumrotatory signal member 3. The casing 1 has an opening at the back through which access is had should inspection of the parts be necessary, and the opening is closed by a cap 4 which is secured in place by any suitable means. A convexed glass cover 5 incloses the front of the casing 1. The glass cover 5 is mounted in a rim 6 which is fitted and secured upon the casing 1 in any suitable manner.

The reflector 2 is parabolic in shape as shown, and has an annular rim 7 by means of which a guard 8 is attached through the brackets 9 which are secured to the guard 8 and the rim 7 respectively. A lamp 10 is mounted in the focal center of the reflector 2 and is adapted to be constantly lighted by the current from a battery B when the switch 11 is closed. Disposed transversely of the headlight casing 1 is a supporting bar 12. The bar 12 has a hole 13 in the middle and is secured in place on the casing 1 by bolts 14 which pass through the ends of the bar into the bracket sockets 15 on the casing, as shown in Fig. 5.

A stem 16 forms the support for the reflector 2, and the reflector is mounted on the stem by means of a screw 17 which is screwed into the stem through the reflector from the front as shown in Fig. 4. The stem 16 has a reduced portion which provides an axle 18 for the hub 19 of a worm gear 20. The stem is still further reduced beyond the axle 18 into a threaded shank 21. The shank 21 passes through the hole 13 in the supporting bar 12, and receives a binding nut 22 on the outer end, to firmly hold the reflector and its appended part on the supporting bar.

Further support of the reflector 2 is afforded by a semi-circular opaque shield 23 which occupies the lower portion of the circle below the center of the reflector 2. The shield 23 is affixed to the reflector 2 in any suitable manner, lugs 24 being shown on the inner periphery of the shield 23, and simply bent over the adjacent parts of the guard 8. The principal function of the shield 23 is to stop the rays of light from a signal lamp 25, in the area of the region around the headlight reflector 2 and below the center as plainly shown in Figs. 1 and 2. The shield 23 is supported on a plurality of lugs 23ª which are set at predetermined places on the rim of the casing 1 as shown in Fig. 2. The shield has suitably placed holes which fit over the lugs, and when the nuts are screwed in place, the shield is held in position and assists in supporting the reflector 2 rigidly in the center of the casing.

The signal member 3 consists preferably of a ring of green colored glass with a clear spot 26 through which white light shines when the signal lamp 25 is lighted. The signal member is arranged to be slowly rotated either in one or the other direction and the signal lamp 25 is lighted simultaneously with the rotation of the signal member, so that the signal lamp 25 illuminates the signal member 3 only when the signal member is made to rotate.

The preferred construction of the signal member embodies a single clear spot, but it may be made with two clear spots 26 and 26ª arranged diametrically opposite each other as shown in Fig. 8. The operation is the same but of course, where two clear spots are employed the white light will shine forth more frequently than it will where but a single spot is employed.

A mounting for the signal member 3 is provided by a pair of rings or bands 26 and 27, each of which has a beaded edge 26ª and 27ª respectively. The signal member is slipped over the inner ring 26 into engagement with the bead 26ª, and then the outer ring 27 is slipped over the ring 26 until the bead 27ª engages the signal member. The signal member is then firmly bound in place, and the rings are held together by a plurality of screws 28. The signal member 3 is supported on the worm gear 20 by a plurality of arms 29. The arms are fixed on the worm gear 20, and the outer ends of the arms are secured to the rings by bolts 30, as shown in Figs. 4 and 7 of the drawings.

If it be desired to employ a substitute for the glass signal member 3, the modified construction illustrated in Fig. 7 may be used. Here the signal member consists of outer and inner celluloid rings 31 between which a colored insert 32 is clamped by the binding 33 which holds the celluloid rings together. The colored insert 32 is preferably green and provided with a cut-out portion to leave an opening for the white light to shine through similarly as is the case in Figs. 1 and 2.

A motor 34 with a worm pinion 35 in engagement with the worm gear 20, rotates the worm gear in one or the other direction upon closure of the reversing switch R in one or the other direction. The motor 34 is supported in the casing 1 in any suitable manner and is introduced through an opening 36 in the bottom of the casing. A cap 37 is secured to the casing over the opening 36. The upper end of the shaft 38 of the motor 34 is journaled in a bracket 39 which depends from the supporting bar 12.

The operation of the automobile signal is as follows. Consider Fig. 6. Ordinarily at night, the headlight lamp 10 is lighted by current from the battery B when the switch 11 is closed. The signal member 3 which is circumjacently mounted on the reflector 2 of the headlight lamp 10 is normally stationary and the signal lamp 25 which illuminates the signal member is normally dark.

Should it now be desired to indicate to pedestrians in front of the automobile that the driver desires to turn toward the right, the reversing switch is thrown over against one pair of the contacts so that current flows from the battery B through the motor 34 in one direction and also through the signal lamp 25, to cause the signal member 3 to rotate accordingly and become visible to those ahead. The clear spot 26 will be seen only during a portion of its rotation about the headlight reflector 2, since the opaque shield 23 at the bottom cuts off all of the light below the center. It should have been stated that a reflector 40 in the casing 1 serves to concentrate the rays of light from the signal lamp 25 on the upper portion of the signal member 3. The clear spot 26 then only makes its appearance in the upper half of the circle, and the purpose of screening off the light below the horizontal center is, to render the signal more plain and indicate the direction the driver intends to take, more clearly. Upon throwing the reversing switch R into engagement with the other contacts, the rotation of the motor 34 is reversed and consequently the direction of rotation of the signal member 3 is also reversed. In either event the signal lamp 25 is lighted and the signal member becomes illuminated.

As an incidental feature of construction, the stem 16 is made hollow in a portion of its length with lateral outlets in the enlarged portion adjacent to the reflector 2, and the wires from the headlight lamp 10 are led into the bore of the stem 16 through these outlets, and then out at the back. It should also be understood that the reversing switch R is simply represented diagrammatically in Fig. 6. In actual practice, this switch will be of such a construction that it can be readily mounted on the steering post so that the driver may reach it easily to operate the automobile signal whenever desired.

While the construction and arrangement of the signal as illustrated in the accompanying drawings is that of a generally preferred form, obviously modifications and changes may be made without departing from the spirit of the invention or the scope of the claims.

I claim:—

1. A headlight, comprising a casing, a lamp in the casing adapted to be continuously lighted, a signal member adapted in operation to continuously move around the headlight lamp, means for moving the signal member, a normally dark lamp behind the signal member, and a normally open electric circuit embracing said moving means and the signal lamp, arranged to be closed and thereby cause the simultaneous operation of the signal member and lighting of the signal lamp.

2. A headlight, comprising a casing, a lamp in the casing adapted to be continuously lighted, a signal member adapted in operation to continuously move around the headlight lamp, means for moving the signal member, a normally dark lamp behind the signal member, a normally open electric circuit embracing said moving means and the signal lamp, arranged to be closed and thereby cause the simultaneous operation of the signal member and lighting of the signal lamp, and means for moving the signal member in either of two directions, said means including a reversing switch in said circuit.

3. A headlight including a casing, a reflector having a headlight lamp adapted to be continuously lighted, means for fixedly supporting the reflector in the casing, a signal member circumrotationally mounted with respect to the reflector, means for imparting movement to said signal member for an interval, a signal lamp arranged to be lighted on imparting movement to said signal member to illuminate said signal member, and means covering a portion of said signal member leaving the remaining portion visible.

4. In a headlight, a casing, a reflector having a lamp adapted to be continuously lighted, means for fixedly supporting the reflector in the casing, a translucent signal member circumrotationally mounted with respect to the reflector, means for simultaneously moving and illuminating said signal member periodically, and an opaque shield covering a portion of said signal member to render visible that portion of the signal member above the shield.

5. In a headlight, a casing, a reflector having a lamp adapted to be continuously lighted, means for fixedly supporting the reflector in the casing, a translucent signal member circumrotationally mounted with respect to the reflector, means for simultaneously moving and illuminating said signal member periodically, an opaque shield covering a portion of said signal member to render visible that portion of the signal member above the shield, and means for concentrating light on the visible portion of said signal member.

6. The combination of a reflector, a translucent signal member circumrotationally mounted with respect to the reflector and having a clear spot movable in a plane around the rim of the reflector, means for imparting a continuous rotary movement to the signal member for an interval and simultaneously illuminating said signal member, and an opaque shield meeting a portion of the edge of the reflector and covering a portion of said signal member to render the clear spot visible during the portion of the movement of said signal member when the clear spot rises beyond the shield.

7. In a headlight including a casing having a rim, a reflector in the center of the casing, means carried by the casing for fixedly supporting the reflector in place, said means including a bearing, a shield attached to a portion of the reflector at the periphery and covering a portion of the space between the periphery of the reflector and the rim of the casing, means on the rim of the casing for securing the shield thereto, a translucent signal member circumrotationally mounted with respect to the reflector behind the shield, a gear journaled on the bearing, supporting means for the signal member carried by the gear, means including a motor and pinion for revolving the gear and the signal member, and a signal lamp behind the signal member arranged to be lighted simultaneously with the energization of the motor.

8. In a headlight including a casing having a rim, a reflector in the center of the casing, means carried by the casing for fixedly supporting the reflector in place, said means including a bearing, a shield attached to a portion of the reflector at the periphery and covering a portion of the space between the periphery of the reflector and the rim of the casing, means on the rim of the casing for securing the shield thereto, a translucent signal member circumrotationally mounted with respect to the reflector behind the shield, a gear journaled on the bearing, supporting means for the signal member carried by the gear, means including a motor and pinion for revolving the gear and the signal member, a signal lamp behind the signal member arranged to be lighted simultaneously with the energization of the motor, and a reflector arranged in the casing to concentrate the rays of light from the signal lamp on the upper portion of said signal member above the shield.

9. A headlight including a casing, a headlight lamp having a reflector fixed in the center of the casing and leaving an annular space, said lamp being adapted to be continuously lighted, an opaque shield mounted on a portion of said reflector and covering said space below the horizontal center of the casing, a signal member consisting of a ring of colored translucent material having a clear spot to permit white light rays to pass, said signal member being rotatable in said space between the reflector and the casing behind the shield, and a signal lamp adapted to be lighted periodically to illuminate said signal member from behind when said member rotates, said clear spot being visible in that portion of the path of its movement above said shield.

10. A headlight including a casing, a headlight lamp having a reflector fixed in the center of the casing and leaving an annular space, said lamp being adapted to be continuously lighted, an opaque shield mounted on a portion of said reflector and covering said space below the horizontal center of the casing, a signal member consisting of a ring of colored translucent material having a clear spot to permit white light rays to pass, said signal member being rotatable in said space between the reflector and the casing behind the shield, a signal lamp adapted to be lighted periodically to illuminate said signal member from behind when said member rotates, said clear spot being visible in that portion of the path of its movement above said shield, and means for rotating said signal member in either direction.

11. A signal member mounting, comprising a signal member, telescopic means for holding the signal member in operative position when secured together, continuously movable means providing the support for said signal member, and means extending from said supporting means to a portion of the signal member structure.

12. In a headlight, a casing having a transverse support, a stem including a threaded portion passing through said support with means for securing the stem in place on the support, said stem including an axle portion and an enlarged head, a reflector occupying the center of the casing, means for securing the reflector on the enlarged head, a shield carried by the reflector and occupying the space between the periphery of the reflector and the adjacent edge of the casing below the horizontal center, means for securing the shield to the reflector and to the adjacent edge of the casing, a translucent signal member having a clear portion, circumjacent to the reflector in back of said shield, means forming a mounting for the signal member, a gear journaled on the axle portion of the stem, supporting means carried by the gear and attached to said signal member mounting, means including a motor and pinion supported in the casing and arranged to drive said gear, a signal lamp behind the signal member adapted to be lighted when the motor is energized, to illuminate the signal member, and means including a reflector for concentrating the rays of light on the portion of the signal member above said shield.

13. An automobile signal, a casing having a support and a semi-circular opaque shield on the inside, a gear journaled on the support, a translucent signal member carried by the gear behind the shield and having a clear spot, a normally dormant motor with a pinion for turning the gear, a normally dark lamp behind the signal member in circuit with the motor, and a reversing switch in said circuit for actuating the motor in either direction to revolve the signal member accordingly while lighting the lamp.

HAMPTON K. SMITH.

Witnesses:
J. M. GREER,
D. C. BEATY.